Feb. 3, 1931.  E. F. GUTH  1,791,125

FAN HUB

Filed April 1, 1929

INVENTOR
EDWIN F. GUTH
BY Dodson & Roe
ATTORNEYS

Patented Feb. 3, 1931

1,791,125

UNITED STATES PATENT OFFICE

EDWIN F. GUTH, OF ST. LOUIS, MISSOURI

FAN HUB

Application filed April 1, 1929. Serial No. 351,624.

My invention relates more particularly to the fan covered by my United States Patent No. 1,699,201, issued January 15, 1929, but will also be useful on any fan stamped from sheet metal. In fans of this type it is essential that they be properly centered, and that they be supported so they will run true.

My invention has for its object, to provide a simple construction which will ensure the fan being permanently supported, and with fewer parts.

My invention has for its further object, to provide means which, when the fan is driven by a vertical motor suspended from the ceiling, will intercept minor oil leaks from the motor bearings.

My means of accomplishing the foregoing objects may be more readily understood by having reference to the accompanying drawings, hereunto annexed and made a part of this specification, in which—

Figure 1:
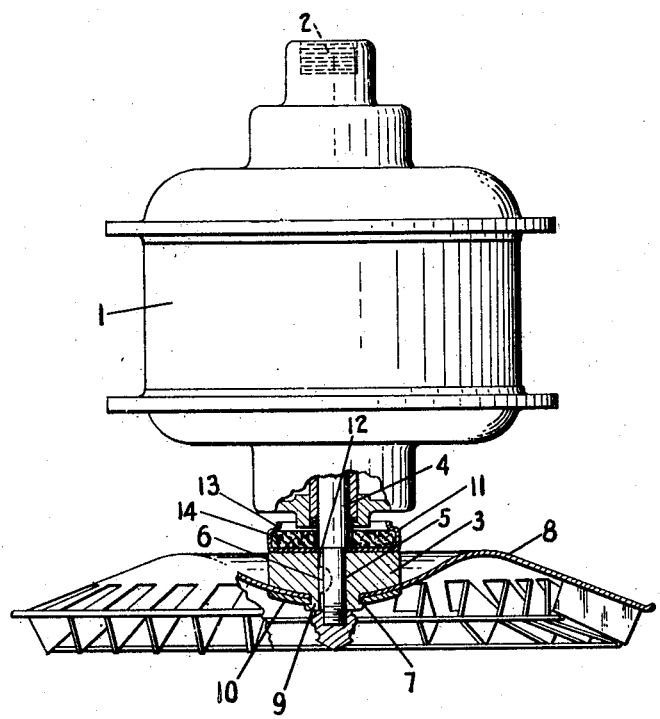
Figure 2:
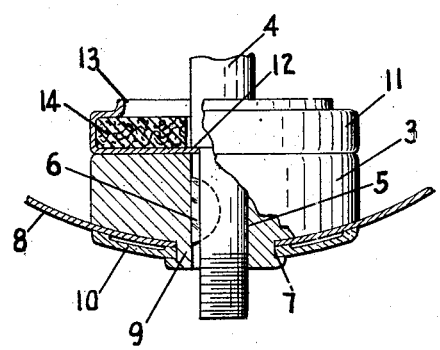

Fig. 1 is a side elevation of a motor driving one of my improved fans, part of the fan being broken away to show the construction of my improved fan hub and oil leak receptacle; and Fig. 2 is an enlarged detail view. Similar reference numerals refer to similar parts throughout the entire description.

As shown in the drawings, the motor 1 is provided with a threaded socket 2, whereby it may be supported from the ceiling in the usual manner (not shown). My improved hub 3 is mounted on the end of the motor shaft 4. The hub 3 consists of a turned metal rod, having a central opening 5 which is fitted to the motor shaft 4. As illustrated, it is provided with a key 6, of standard construction, though it may, if desired, be threaded on to the shaft 4. The lower side of the hub 3 is turned to fit the shape of the fan disc 8. For clamping the fan disc 8 more tightly than would be the case if it were plain, I provide a central stud 9 which extends through a hole in the disc 8, thus centering the disc. A washer 10 is placed on the stud 9, this washer has a peripheral flange, clearly seen in Fig. 2, which extends laterally and contacts, as clearly shown, with the disc 8; the end of the stud 9 is then peened over, the disc is clamped tightly in place, and is thus certain to run true.

Above the hub 3 I mount the oil leak receptacle. As shown, it is separate from the hub 3, though obviously it may be made integral with the hub. The oil leak receptacle consists of a cup 11, formed preferably of copper, which is clamped tightly between a shoulder 12 on the motor shaft 4 and the hub 3, so as to make a leak-proof joint. The upper edge 13 of the cup 11 is inturned, so as to catch and retain the oil which might run down the shaft 4 and be thrown outwardly; for, though fan motors for this use are made oil leak-proof mechanically, it does sometimes occur in practice that a few drops may leak out, should the motor become overheated. A felt washer 14 is mounted in the cup 11, and serves to retain the oil.

Having described my invention, what I regard as new, and desire to secure by Letters Patent of the United States, is:

The combination with a disc fan having its central portion concave on one side and convex on the other, of a shaft, a hub having a convex portion which fits said concave surface on the disc, said hub being mounted on said shaft, a central stud on said hub which projects through said disc, a concave washer having a peripheral flange which fits the convex surface of the disc and means to clamp said disc between said flange and said hub.

EDWIN F. GUTH.